United States Patent
Sacchetti et al.

(10) Patent No.: US 7,307,035 B2
(45) Date of Patent: Dec. 11, 2007

(54) MAGNESIUM DICHLORIDE-ALCOHOL ADDUCTS AND CATALYST COMPONENTS OBTAINED THEREFROM

(75) Inventors: Mario Sacchetti, Ferrara (IT); Daniele Evangelisti, Ferrara (IT); Diego Brita, Ferrara (IT); Gianni Collina, Ferrara (IT)

(73) Assignee: Basell Poliolefine Italia SpA, Milan (IT)

( * ) Notice: Subject to any disclaimer, the term of this patent is extended or adjusted under 35 U.S.C. 154(b) by 0 days.

(21) Appl. No.: 10/493,636

(22) PCT Filed: Jul. 4, 2003

(86) PCT No.: PCT/EP03/07227

§ 371 (c)(1),
(2), (4) Date: Apr. 22, 2004

(87) PCT Pub. No.: WO2004/009658

PCT Pub. Date: Jan. 29, 2004

(65) Prior Publication Data

US 2004/0254063 A1  Dec. 16, 2004

Related U.S. Application Data

(60) Provisional application No. 60/411,394, filed on Sep. 17, 2002.

(30) Foreign Application Priority Data

Jul. 23, 2002  (EP) .................................. 02078049

(51) Int. Cl.
*C08F 4/42* (2006.01)

(52) U.S. Cl. ...................... 502/102; 502/103; 502/115; 502/117; 502/118; 502/125; 502/126; 502/127; 528/124.3

(58) Field of Classification Search ................ 502/103, 502/102, 115, 117, 118, 125, 126, 127; 526/124.3
See application file for complete search history.

(56) References Cited

U.S. PATENT DOCUMENTS

| 4,399,054 | A |   | 8/1983  | Ferraris et al.   | 252/429 B |
| 4,506,027 | A | * | 3/1985  | Invernizzi et al. | 502/9     |
| 5,726,261 | A | * | 3/1998  | Sacchetti et al.  | 526/124.2 |
| 6,127,304 | A | * | 10/2000 | Sacchetti et al.  | 502/125   |
| 2004/0048738 | A1 | * | 3/2004 | Collina et al.   | 502/118   |
| 2005/0014632 | A1 | * | 1/2005 | Evangelisti et al. | 502/118 |

FOREIGN PATENT DOCUMENTS

| EP | 0522650 | 1/1993  |
| EP | 0553805 | 8/1993  |
| WO | 9844009 | 10/1998 |

* cited by examiner

*Primary Examiner*—Michael Marcheschi
(74) *Attorney, Agent, or Firm*—Jarrod N Raphael; William R Reid

(57) ABSTRACT

The present invention relates to an adduct comprising $M_gCl_2$, an alcohol (ROH) in which R is a C1-C10 hydrocarbon group, and a compound containing a transition metal M selected from the Groups 3 to 11 or the lanthanide or actinide groups of the Periodic Table of the Elements (new IUPAC version) in an amount such as to give a weight of M atoms lower than 10% based on the total weight of the adduct. The catalyst components that are obtained by reacting the adducts with halogenating agents show very high specific activity.

22 Claims, No Drawings

MAGNESIUM DICHLORIDE-ALCOHOL ADDUCTS AND CATALYST COMPONENTS OBTAINED THEREFROM

This application is the U.S. national phase of International Application PCT/EP2003/007227, filed Jul. 4, 2003, claiming priority to European Patent Application 02078049.0 filed Jul. 23, 2002, and the benefit under 35 U.S.C. 119(e) of U.S. Provisional Application No. 60/411,394 filed Sep. 17, 2002.

The present invention relates to magnesium dichloride/ethanol adducts containing specific amounts of transition metal compounds. The adducts of the present invention are particularly useful as catalyst components or precursors of catalyst components for the polymerization of olefins.

$MgCl_2$.alcohol adducts and their use in the preparation of catalyst components for the polymerization of olefins are well known in the art.

Catalyst components for the polymerization of olefins, obtained by reacting $MgCl_2$.nEtOH adducts with halogenated transition metal compounds, are described for example in U.S. Pat. No. 4,399,054. The adducts are prepared by emulsifying the molten adduct in an immiscible dispersing medium and quenching the emulsion in a cooling fluid to collect the adduct in the form of spherical particles.

In WO98/44009 are disclosed $MgCl_2$.alcohol adducts having improved characteristics and characterized by a particular X-ray diffraction spectrum, in which, in the range of 2θ diffraction angles between 5° and 15°, the three main diffraction lines are present at diffraction angles 2θ of 8.8±0.2°, 9.4±0.2° and 9.8±0.2°, the most intense diffraction lines being the one at 2θ=8.8±0.2°, the intensity of the other two diffraction lines being at least 0.2 times the intensity of the most intense diffraction line. Said adducts can be of formula $MgCl_2$.mEtOH.n$H_2O$ where m is between 2.2 and 3.8 and n is between 0.01 and 0.6. These adducts are obtained by specific preparation methods involving the reaction between $MgCl_2$ and alcohol under specific conditions such as long reaction times, absence of inert diluents or use of vaporized alcohol. In all the cases, in order to produce a catalytic components a transition metal compound must be fixed on the support. This is obtained by contacting the supports with large amounts of titanium compounds, in particular $TiCl_4$, that causes removal of the alcohol and supportation of Ti atoms. Usually this treatment is repeated twice or three times and although the catalyst components obtained from these adducts have a high activity, the process for their preparation requires the treatment of large quantities of $TiCl_4$ in order to remove the side-products and recycle it.

In EP 522650 it is described the preparation of a catalyst component which comprises (i) reacting a $MgCl_2$-alcohol adduct, obtained by spray drying technique, with titanium tetralkoxides in the presence of a liquid hydrocarbon solvent, (ii) heating the suspension until obtaining a homogeneous solution and then cooling the solution to precipitate a solid which (iii) is reacted with an aluminum alkyl halide. In all the final catalysts the content of Ti is always higher than 10% b.w. The maximum specific activity of the catalyst (Kgpol/gTi.h.atmC2) is about 12.

In view of the above, it would be important to have catalyst components coupling high activity and capability of being produced employing low amounts of transition metal compounds. The applicant has now found new adducts having specific chemical and physical properties that satisfy the said needs.

The present invention therefore relates to an adduct comprising a $MgCl_2$, an alcohol ROH present in a molar ratio with $MgCl_2$ defined by the formula $MgCl_2$.m(ROH) in which m is a number from 0.5 to 6 and R is a C1-C10 hydrocarbon group, and a compound containing a transition metal M selected from the Groups 3 to 11 or the lanthanide or actinide groups of the Periodic Table of the Elements (new IUPAC version) in an amount such as to give a weight of M atoms lower than 10% based on the total weight of the adduct.

Preferably, the adduct of the present invention has the formula $MgCl_2.m(ROH)n[(Cp)_p(ZR^1_q)_r(A)_sML_t]$ in which R, M and m have the meanings given above, wherein $(ZR^1_q)_r$ is a divalent group bridging Cp and A; Z being C, Si, Ge, N or P, and the $R^1$ groups, equal to or different from each other, being hydrogen or linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylaLkyl groups or two $R^1$ can form a aliphatic or aromatic $C_4$-$C_7$ ring;

Cp is a substituted or unsubstituted cyclopentadienyl group, optionally condensed to one or more substituted or unsubstituted, saturated, unsaturated or aromatic rings, containing from 4 to 6 carbon atoms, optionally containing one or more heteroatoms;

A is O, S, $NR^2$, $PR^2$ wherein $R^2$ is hydrogen, a linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl, or A has the same meaning of Cp;

the substituents L, equal to or different from each other, are monoanionic sigrna ligands selected from the group consisting of hydrogen, halogen, $R^3$, $OR^3$, $OCOR^3$, $SR^3$, $NR^3_2$ and $PR^3_2$, wherein $R^3$ is a linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl group, optionally containing one or more Si or Ge atoms; preferably, the substituents L are the same;

n is a number such as to give a weight of M atoms which is lower than 10% based on the total weight of the adduct;

p is 0, or 1;

q is 1 or 2, and more specifically it is 1 when Z is N or P, and it is 2 when Z is C, Si or Ge;

r is an integer ranging from 0 to 4;

s is 0, 1 or 2; preferably 0 or 1; r is 0 when s is 0;

t is an integer corresponding to the formula v−(p+s) where v is the oxidation state of the metal M.

Preferably, n is a number such as to give a weight of M atoms which is lower than 7%, more preferably lower than 5% and still more preferably lower than 2%. Preferably, m ranges from 1 to 5 and more preferably from 1.5 to 4.

In a particular embodiment of the present invention, in the adduct of the above formula p and s are 0. When this is the case, the adducts of the present invention are preferably selected from the addutcs of formula $MgCl_2.m(ROH)n[M(OR^3)_aX_{b-a}]$ in which m, n, R and $R^3$ have the meaning given above, M is Ti, Zr or V, a is comprised between 0 and b; b is the valence of M and X is halogen. Preferably, M is Ti, X is chlorine and $R^3$ is selected from linear or branched $C_1$-$C_{10}$ hydrocarbon groups. More preferably $R^3$ is selected among C1-C7 alkyls such as ethyl, propyl, isopropyl, butyl, isobutyl, t-butyl, and C6-C9 aryl or alkylaryl groups such as phenyl or tolyl. Preferred transition metal compounds are $Ti(OBu)_4$, $Ti(OBu)Cl_3$, $Ti(OBu)_2Cl_2$, and $Ti(OBu)_3Cl$.

The adduct of the present invention can be prepared according to different techniques. The general method comprises bringing into contact the suitable amount of magnesium chloride, transition metal compound and alcohol heating the system until a molten adduct is formed and then rapidly cooling the system in order to solidify the particles preferably in spherical form. The contact between magnesium chloride, transition metal compound and alcohol can occur in the presence of in the absence of an inert liquid immiscible with and chemically inert to the molten adduct. If the inert liquid is present it is preferred that the desired amount of alcohol is added in vapour phase. This would ensure a better homogeneity of the formed adduct. The liquid in which the adduct is dispersed can be any liquid immiscible with and chemically inert to the molten adduct. For example, aliphatic, aromatic or cycloaliphatic hydrocarbons can be used as well as silicone oils. Aliphatic hydrocarbons such as vaseline oil are particularly preferred. After the $MgCl_2$ particles, the alcohol and the transition metal compound are dispersed in the liquid phase the mixture is heated at a temperature at which the adduct reaches its molten state. This temperature depends on the composition of the adduct and generally ranges from 80 to 150° C. As mentioned before the temperature is kept at values such that the adduct is completely melted. Preferably the adduct is maintained in the molten state under stirring conditions, for a time period equal to or greater than 10 hours, preferably from 10 to 150 hours, more preferably from 20 to 100 hours.

In order to obtain solid discrete particles of the adduct with suitable morphology it is possible to operate in different ways. One of the possibilities is the emulsification of the adduct in a liquid medium which is immiscible with and chemically inert to it followed by the quenching carried out by contacting the emulsion with an inert cooling liquid, thereby obtaining the solidification of the particles of the adduct in spherical form.

A preferred method for obtaining the solidification of the adduct consists in adopting the spray-cooling technique. When this option is pursued it is preferred that in the first step the magnesium chloride the transition metal compound and the alcohol are contacted to each other in the absence of an inert liquid dispersant. After having been melted the adduct is sprayed, through the use of the proper devices that are commercially available, in an environment having temperature so low as to cause rapid solidification of the particles. In a preferred aspect the adduct is sprayed in a cold liquid environment and more preferably in a cold liquid hydrocarbon.

Preferably the adducts obtained according to the general method reported above contain water up to a maximum of 1% wt based on the total weight of the adduct and are further characterized by a DSC profile in which the highest melting Temperature (Tm) peak is lower than 115° and has an associated fusion enthalpy (ΔH) lower than 103 J/gr preferably in the range 70-100 J/gr. It is also possible, but not strictly required, that also the adducts of the present invention are characterized by an X-ray diffraction spectrum in which, in the range of 2θ diffraction angles between 5° and 15°, the three main diffraction lines are present at diffraction angles 2θ of 8.8±0.2°, 9.4±0.2° and 9.8±0.2°, the most intense diffraction line being the one at 2θ=8.8±0.2°, the intensity of the other two diffraction lines being at least 0.2 times the intensity of the most intense diffraction line. Moreover, the said adduct show an X-ray diffraction spectrum in which in the range of 2θ diffraction angles between 5° and 50° the characteristic diffraction lines of the α-$MgCl_2$ are not present.

In order to obtain these adducts the amount of water should be carefully controlled. A particular attention should be paid to the water content of the reactants. Both $MgCl_2$ and EtOH are in fact highly hygroscopic and tend to incorporate water in their structure. As a result, if the water content of the reactants is relatively high, the final $MgCl_2$-EtOH adducts may contain a too high water content even if water has not been added as a separate component. Means for controlling or lowering the water content in solids or fluids are well known in the art. The water content in $MgCl_2$ can be for example lowered by drying it in an oven at high temperatures or by reacting it with a compound which is reactive towards water. As an example, a stream of HCl can be used to remove water from $MgCl_2$. Water from the fluids can be removed by various techniques such as distillation or by allowing the fluids to become in contact with substances capable to subtract water such as molecular sieves. Once this precautions have been taken, the reaction between the magnesium chloride the ethanol and the transition metal compound to produce the adducts of the invention can be carried out according to the methods reported above.

In addition to the above mentioned components, the adducts of the invention can also contain an electron donor compound. Said electron donor compound can be selected from esters, ethers, amines, silanes and ketones. In particular, the alkyl and aryl esters of mono or polycarboxylic acids such as for example esters of benzoic, phthalic, malonic and succinic acid are preferred. Specific examples of such esters are n-butylphthalate, di-isobutylphthalate, di-n-octylphthalate, diethyl 2,2-diisopropylsuccinate, diethyl 2,2-dicyclohexyl-succinate, ethyl-benzoate and p-ethoxy ethyl-benzoate. Moreover, among ethers can be advantageously used cyclic ethers such as tetrrhydrofurane and also the 1,3 diethers of the formula:

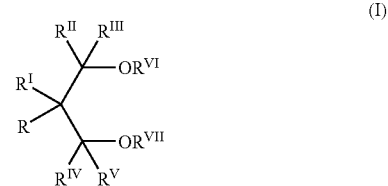

(I)

wherein R, $R^I$, $R^{II}$, $R^{III}$, $R^{IV}$ and $R^V$ equal or different to each other, are hydrogen or hydrocarbon radicals having from 1 to 18 carbon atoms, and $R^{VI}$ and $R^{VII}$, equal or different from each other, have the same meaning of R-$R^V$ except that they cannot be hydrogen; one or more of the R-$R^{VII}$ groups can be linked to form a cycle. The 1,3-diethers in which $R^{VI}$ and $R^{VII}$ are selected from $C_1$-$C_4$ alkyl radicals are particularly preferred.

The electron donor compound is generally present in molar ratio with respect to the magnesium comprised between 1:4 and 1:20.

The adducts according to the present invention already possess the ability to polymerize olefins when activated by a suitable cocatalyst. In particular the polymerization activity is higher if the adduct is previously subject to a dealcoholation treatment which can be carried out chemically of physically. Preferably, the dealcoholation is carried out via a hot (80-130° C.) nitrogen flow. Preferably, the extent of the dealcoholation is such that the content of alcohol is lowered to a level such that m is in the range of 0.5-1.5. A still higher activity is obtained by reacting the dealcoholated adduct with a halogenating, preferably chlorinating, compound optionally having also a reducing activity. Specific examples of such compounds include organic acid halides RCOX (in which X is halogen, preferably chlorine, and R is an aliphatic or aromatic radical); hydrogen halides such as HCl, $SOCl_2$, $COCl_2$, $TiCl_4$, $BCl_3$, and others.

Particularly satisfactory results are achieved by using halogen-containing silicon compounds or halogen and hydrogen-containing silicon compounds. The latter act as both reducing agents and halogenating agents. Specific examples of such silicon compounds include:

silicon halides having formula $SiX_{4-n}Y_n$, in which X and Y represent halogen atoms, e.g., Cl and Br, and n is a number varying from zero to 3, inclusive as $SiCl_4$;

chlorosiloxanes of formula $Si_nO_{n-1}Cl_{2n+2}$, in which n is a number varying form 2 to 7 inclusive, e.g., $Si_2OCl_6$;

Halogenated polysilanes having formula $Si_nX_{2n+2}$, wherein X is halogen and n is a number varying form 2 to 6, inclusive, for instance $Si_4Cl_{10}$;

Halogensilanes having formula $SiH_{4-n}X_n$ in which X is halogen and n is a number varying form 1 to 3, inclusive, e.g., $SiHCl_3$;

Alkyl-halogensilanes having formula $R_nSiH_xX_y$, wherein R is an aliphatic or aromatic radical, X is halogen, n is a number from 1 to 3, inclusive, x is a number varying form zero to 2, inclusive, and y is a number varying form 1 to 3, inclusive, e.g., $C_2H_5SiCl_3$; $CH_3SiCl_2H$; $(CH_3)_2SiCl_2$;

Alkoxy-halogensilanes of formula $Si(OR)_{4-n}X_n$ in which X is halogen, R is alkyl or aryl having 1 to 20 carbon atoms and n is a number from 1 to 3, inclusive, e.g., $Si(OC_2H_5)Cl_3$.

Example of compounds having both halogenating and reducing activity are the aluminum compounds of formula $AlR_{3-z}X_z$ where R is a C1-C15 hydrocarbon alkyl radical, X is halogen preferably chlorine and z is a number 0<z<3. Preferred compounds are $AlMe_2Cl$, $AlEt_2Cl$ and $Al_2Et_3Cl_3$.

Although the so obtained catalysts are already endowed with a high polymerization activity, if desired they can be further contacted with transition metal compounds in order to increase the content of M in the catalyst. The additional transition metal compound can be same as or different from that already present in the adduct.

The catalyst components of the invention form catalysts for the polymerization of alpha-olefins $CH_2$=CHR, wherein R is hydrogen or a hydrocarbon radical having 1-12 carbon atoms, by reaction with Al-alkyl compounds. The alkyl-Al compound can be of the formula $AlR_{3-z}X_z$ above, in which R is a C1-C15 hydrocarbon alkyl radical, X is halogen preferably chlorine and z is a number $0 \leq z < 3$. The Al-alkyl compound is preferably chosen among the trialkyl aluminum compounds such as for example trimethylaluminum, triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as $AlEt_2Cl$ and $A_2Et3Cl_3$ optionally in mixture with said trialkyl aluminum compounds.

The Al/Ti ratio is higher than 1 and is generally comprised between 20 and 800.

It is possible to use in the polymerization an electron donor compound (external donor) which can be the same or different from the compound that can be used as internal donor disclosed above. In case the internal donor is an ester of a polycarboxylic acid, in particular a phthalate, the external donor is preferably selected from the silane compounds containing at least a Si-OR link, having the formula $R_a^1R_b^2Si(OR^3)_c$, where a and b are integer from 0 to 2, c is an integer from 1 to 3 and the sum (a+b+c) is 4; $R^1$, $R^2$, and $R^3$, are alkyl, cycloalkyl or aryl radicals with 1-18 carbon atoms. Particularly preferred are the silicon compounds in which a is 1, b is 1, c is 2, at least one of $R^1$ and $R^2$ is selected from branched alkyl, cycloalkyl or aryl groups with 3-10 carbon atoms and $R^3$ is a C1-C10 alkyl group, in particular methyl. Examples of such preferred silicon compounds are methylcyclohexyldimethoxysilane, diphenyldimethoxysilane, methyl-t-butyldimethyoxysilane, dicyclopentyldimethoxysilane. Moreover, are also preferred the silicon compounds in which a is 0, c is 3, $R^2$ is a branched alkyl or cycloalkyl group and $R^3$ is methyl. Examples of such preferred silicon compounds are cyclohexyltrimethoxysilane, t-butyltrimethoxysilane and thexyltrimethoxysilane.

Also the cyclic ethers such as tetrahydrofurane, and the 1,3 diethers having the previously described formula can be used as external donor.

As previously indicated the components of the invention and catalysts obtained therefrom find applications in the processes for the (co)polymerization of olefins of formula $CH_2$=CHR in which R is hydrogen or a hydrocarbon radical having 1-12 carbon atoms.

The catalysts of the invention can be used in any of the olefin polymerization processes known in the art. They can be used for example in slurry polymerization using as diluent an inert hydrocarbon solvent or bulk polymerization using the liquid monomer (for example propylene) as a reaction medium. Moreover, they can also be used in the polymerization process carried out in gas-phase operating in one or more fluidized or mechanically agitated bed reactors.

The polymerization is generally carried out at temperature of from 20 to 120° C., preferably of from 40 to 80° C. When the polymerization is carried out in gas-phase the operating pressure is generally between 0.1 and 10 MPa, preferably between 1 and 5 MPa. In the bulk polymerization the operating pressure is generally between 1 and 6 MPa preferably between 1.5 and 4 MPa.

The catalysts of the invention are very useful for preparing a broad range of polyolefin products. Specific examples of the olefinic polymers which can be prepared are: high density ethylene polymers (HDPE, having a density higher than 0.940 g/cc), comprising ethylene homopolymers and copolymers of ethylene with alpha-olefins having 3-12 carbon atoms; linear low density polyethylenes (LLDPE, having a density lower than 0.940 g/cc) and very low density and ultra low density (VLDPE and ULDPE, having a density lower than 0.920 g/cc, to 0.880 g/cc) consisting of copolymers of ethylene with one or more alpha-olefins having from 3 to 12 carbon atoms, having a mole content of units derived from the ethylene higher than 80%; isotactic polypropylenes and crystalline copolymers of propylene and ethylene and/or other alpha-olefins having a content of units derived from propylene higher than 85% by weight; copolymers of propylene and 1-butene having a content of units derived from 1-butene comprised between 1 and 40% by weight; heterophasic copolymers comprising a crystalline polypropylene matrix and an amorphous phase comprising copolymers of propylene with ethylene and or other alpha-olefins.

The following examples are given to further illustrate without limiting in any way the invention itself.

Characterization

The properties reported below have been determined according to the following methods: Fraction soluble in xylene (XS) The solubility in xylene at 25° C. was determined according to the following method: About 2.5 g of polymer and 250 ml of o-xylene were placed in a round-bottomed flask provided with cooler and a reflux condenser and kept under nitrogen. The mixture obtained was heated to 135° C. and was kept under stiring for about 60 minutes. The final solution was allowed to cool to 25° C. under continuous stirring, and was then filtered. The filtrate was then evaporated in a nitrogen flow at 140° C. to reach a constant weight.

The content of said xylene-soluble fraction is expressed as a percentage of the original 2.5 grams.

Comonomer Content

1-Butene was determined via Infrared Spectrometry.

The α-olefins higher than 1-butene were determined via Infra-Red analysis.

Effective density: according to ASTM-D 1505 using a gradient column. The measurement was carried out on a portion of the polymer extruded for the Melt Index determination.

EXAMPLES

General Procedure for the HDPE Polymerization Test

Into a 4.5 liters stainless steel autoclave, degassed under $N_2$ stream at 70° C., 1.6 liters of anhydrous hexane, the reported amount of catalyst component and 0.5 g of triethylaluminum (TEAL) were introduced. The whole was stirred, heated to 75° C. and thereafter 4 bar of $H_2$ and 7 bar of ethylene were fed. The polymerization lasted 2 hours during which ethylene was fed to keep the pressure constant. At the end, the reactor was depressurized and the polymerization stopped by injection of CO. The polymer recovered was dried under vacuum at 60° C.

Procedure for the LLDPE Polymerization Test (1)

A 4.5 L stainless-steel- autoclave equipped with a helical magnetic stirrer, temperature and pressure indicator, feed line for ethylene, propane, hydrogen, 1-butene and a steel vial for the injection of the catalyst was used and purified by flushing ethylene at 80° C. and washing with propane. In the following order, 0.96 g of TEAL and 50 mg of the solid catalyst matured for 5 minutes and introduced in the empty reactor in a stream of propane. The autoclave was then closed and 1.6 l of propane were introduced, after which the temperature was raised to 75° C. (10 minutes) with simultaneous introduction of ethylene up to 7 bar of partial pressure and 1-butene in the amount reported in Table 1. At the end, 1 bar of hydrogen (partial pressure) were added. Under continuous stirring, the total pressure was maintained at 75° C. for 120 minutes by feeding an ethylene/1-butene mixture (9:1 molar ratio). At the end, the reactor was depressurized and the polymerization stopped by injection of CO. The polymer recovered was dried under vacuum at 60° C.

Procedure for the LLDPE Polymerization Test (2)

As described in the general procedure (1), but using 0.6 g of TMA (instead of TEAL) and 0.12 g of THF with the solid catalyst.

Example 1

1.1 Preparation of the Adduct

In a vessel reactor equipped with a IKA RE 166 stirrer, containing 136.71 g of anhydrous EtOH, 4.65 g of Ti(OBu)$_4$ were added (5% with respect with MgCl$_2$, by weight), at room temperature. The mixture was then cooled down to 12.3° C. and 93.02 grams of MgCl$_2$ (containing 0.3% water) were introduced under stirring. Once the addition of MgCl$_2$ was completed, the temperature was raised up to 125.8° C. and kept at this value for about 3 hours. After that, 1600 cm$^3$ of OB55 vaseline oil were introduced and, while keeping the temperature at 125° C., the stirring was brought to 1500 rpm and kept at that value for two minutes. After that time the mixture was discharged into a vessel containing hexane which was kept under stirring and cooled so that the final temperature did not exceed 12° C. After 12 hours, the solid particles of the recovered adduct were then washed with hexane and dried at 40° C. under vacuum. The compositional analysis showed that the resulting spherical support (217 grams) contained 56.5% EtOH, 1.6% BuOH, H$_2$O 0.44% and 0.3% Ti (% by weight).

1.2 Dealcoholation

In a glass flask of a rotary evaporator (FIG. 1), 100 g of spherical adduct prepared as described above in 1.1 were introduced. The adduct was then carefully warned, under a light vacuum, bringig the temperature from 50 to 105° C. in about 15 minutes. At the end, the product was recovered and EtOH content resulted of 38 wt %.

1.3 Activation

In a 1-litre glass reactor, 25 grams of the spherical adduct prepared as reported in 1.2 were loaded with 500 cc of anhydrous hexane.

At temperature of 0° C., 23 g of DEAC were fed (DEAC diluted in hexane at 100 g/l) very carefully, and then, temperature was raised up to 50° C. The mixture was stirred approximately for 1 hour.The liquid phase was siphoned and the product was washed three times with fresh hexane at room temperature. The product was recovered and dried under vacuum at 40° C. The compositional analysis showed that they contained 15.1% by weight of Mg, 51.9% of Cl, 5.4% of Al, 15.5% of EtOH and 0.5% Ti.

The so obtained catalyst was used in the HDPE and LLDPE polymerizations according to the procedures reported above. The results are shown in table 1.

Example 2

In a 1-litre glass reactor, 25 grams of spherical support prepared as reported in Example 1.2 were loaded with 500 cc of anhydrous hexane.

At temperature of 0° C., 11.5 g of DEAC were fed (DEAC diluted in hexane at 100 g/l) very carefully, and then, temperature was raised up to 50° C. The mixture was stirred approximately for 1 hour. The liquid phase was siphoned and the treatment with DEAC was repeated. At the end, the product was washed three times with fresh hexane at room temperature. The product was recovered and dried under vacuum at 40° C. The product was recovered and dried under vacuum at 40° C. The compositional analysis showed that they contained 15.9% by weight of Mg, 54.3% of Cl, 5.5% of Al 14.1% of ETOH and 0.5% Ti. The so obtained catalyst was used in the HDPE and LLDPE polymerizations according to the procedures reported above. The results are shown in table 1.

Example 3

3.1 Preparation of the Adduct

As described in example 1.1, but feeding 8 wt % of Ti(OBut)4 with respect to MgCl$_2$.

3.2 Dealcoholation

As described in example 1.2 with the difference that the maximum temperature was reached in about 20 minutes. The EtOH content in the final product was 24.5 wt %.

3.3 Activation

In a 2-litres glass reactor, 35 grams of the spherical adduct prepared as reported in 3.2 were loaded with 700 cc of anhydrous hexane.

At temperature of 0° C., 54.4 g of EASC were fed (EASC diluted in hexane at 100 g/l) very carefully, and then, temperature was raised up to 50° C. The mixture was stirred approximately for 1 hour. The liquid phase was siphoned and the product was washed three times with fresh hexane at room temperature. The product was recovered and dried under vacuum at 40° C. The compositional analysis showed that they contained 20.2% by weight of Mg, 66.7% of Cl, 2.5% of Al, 1.8% of EtOH and 0.9% Ti.

The so obtained catalyst was used in the HDPE polymerisation according to the procedures reported above. The results are shown in table 1.

Example 4

1.1 Preparation of the Adduct

In a vessel reactor equipped with a IKA RE 166 stirrer, containing 85.87 g of anhydrous EtOH, 35 g of Ti(OBu)$_4$ were added (40.8% with respect with MgCl$_2$, by weight), at room temperature. The mixture was then cooled down to −11.4° C. and 85.75 grams of MgCl$_2$ (containing 0.3% water) were introduced under stirring. Once the addition of MgCl$_2$ was completed, the temperature was raised up to 130° C. and kept at this value for about 3 hours. After that, 1600 cm$^3$ of OB55 vaseline oil were introduced and, while keeping the temperature at 130° C., the stirring was brought to 1500 rpm and kept at that value for two minutes. After that time the mixture was discharged into a vessel containing hexane which was kept under stirring and cooled so that the final temperature did not exceed 12° C. After 12 hours, the solid particles of the recovered adduct were then washed with hexane and dried at 40° C. under vacuum. The compositional analysis showed that the resulting spherical support contained 19.4% EtOK, 13.3% BuOH, H$_2$O 0.14%, 10.5% Mg and 1.7% Ti (% by weight).

Example 5

1.1 Preparation of the Adduct

In a vessel reactor equipped with a IKA RE 166 stirrer, containing 124.59 g of anhydrous EtOH, 6.8 g of Ti(OEt)$_4$ were added (8% with respect with MgCl$_2$, by weight), at room temperature. The mixture was then cooled down to −7.8° C. and 85.04 grams of MgCl$_2$ (containing 0.3% water) were introduced under stirring. Once the addition of MgC$_2$ was completed, the temperature was raised up to 125° C. and kept at this value for about 3 hours. After that, 1600 cm$^3$ of OB55 vaseline oil were introduced and, while keeping the temperature at 125° C., the stirring was brought to 1500 rpm and kept at that value for two minutes. After that time the mixture was discharged into a vessel containing hexane which was kept under stirring and cooled so that the final temperature did not exceed 12° C. After 12 hours, the solid particles of the recovered adduct were then washed with hexane and dried at 40° C. under vacuum. The compositional analysis showed that the resulting spherical support (200 grams) contained 55.5% EtOH, H$_2$O 0.2% and 0.7% Ti (% by weight).

Example 6

1.1 Preparation of the Adduct 126.32 g of anhydrous EtOH were loaded in a vessel reactor equipped with a IKA RE 166 stirrer and were then cooled down to −8.2° C. Then a mixture of 85.08 grams of MgCl$_2$ and 6.8 g of TiCl$_3$(OEt) was added (8% with respect with MgCl$_2$, by weight), under stirring. Once the addition of MgCl$_2$ was completed, the temperature was raised up to 127° C. and kept at this value for about 3 hours. After that, 1600 cm$^3$ of OB55 vaseline oil were introduced and, while keeping the temperature at 127° C., the stirring was brought to 1500 rpm and kept at that value for two minutes. After that time the mixture was discharged into a vessel containing hexane which was kept under stirring and cooled so that the final temperature did not exceed 12° C. After 12 hours, the solid particles of the recovered adduct were then washed with hexane and dried at 40° C. under vacuum. The compositional analysis showed that the resulting spherical support (198.5 grams) contained 53% ETOH, H$_2$O 1.5%, Mg 10.1% and 0.45% Ti (% by weight).

Example 7

1.1 Preparation of the Adduct 125.66 g of anhydrous EtOH were loaded in a vessel reactor equipped with a IKA RE 166 stirrer and were then cooled down to −6.7° C. Then a mixture of 85.54 grams of MgCl$_2$ and 6.8 g of TiCl$_2$(OBu) (Titanium as Ti$^{(III)}$) was added (8% with respect with MgCl$_2$, by weight), under stiring. Once the addition of MgCl$_2$ was completed, the temperature was raised up to 125.3° C. and kept at this value for about 3 hours. After that, 1600 cm$^3$ of OB55 vaseline oil were introduced and, while keeping the temperature at 125.3° C., the stirring was brought to 1500 rpm and kept at that value for two minutes. After that time the mixture was discharged into a vessel containing hexane which was kept under stifling and cooled so that the final temperature did not exceed 12° C. After 12 hours, the solid particles of the recovered adduct were then washed with hexane and dried at 40° C. under vacuum. The compositional analysis showed that the resulting spherical support (193.45 grams) contained 52.8% EtOH, BuOH 0.8%, H$_2$O 1.35%, Mg 10.5%, Cl 30.8% and 0.6% Ti (% by weight).

TABLE 1

| Example | Procedure (type) | Catalyst (mg) | C$_4^-$bath (g) | Activity KgPol/gTi/h | C$_4^-$polymer (%) | XS (%) | Density (g/ml) |
|---|---|---|---|---|---|---|---|
| 1 | HDPE | 80 | — | 190 | — | — | — |
|   | LLDPE(1) | 50 | 150 | 380 | 4.6 | 3.4 | 0.928 |
|   | LLDPE(1) | 50 | 180 | 290 | 6.1 | 6.6 | 0.925 |
|   | LLDPE(2) | 50 | 200 | 140 | 6.3 | 2.1 | 0.9236 |
| 2 | HDPE | 60 | — | 220 | — | — | — |
|   | LLDPE | 50 | 180 | 250 | 6.8 | 7.7 | 0.922 |

TABLE 1-continued

| | Polymerization conditions | | | | Polymer characteristics | | |
|---|---|---|---|---|---|---|---|
| Example | Procedure (type) | Catalyst (mg) | C₄⁻bath (g) | Activity KgPol/gTi/h | C₄⁻polymer (%) | XS (%) | Density (g/ml) |
| | LLDPE | 51 | 200 | 240 | 7.9 | 11.6 | 0.919 |
| 3 | HDPE | 70 | — | 190 | — | — | — |

The invention claimed is:

1. An adduct comprising $MgCl_2$, an alcohol ROH present in a molar ratio with $MgCl_2$ defined by the formula $MgCl_2 \cdot m(ROH)$ wherein m is a number from 0.5 to 6 and R is a C1-C10 hydrocarbon group, and a compound containing a transition metal M selected from the Groups 3 to 11 or the lanthanide or actinide groups of the Periodic Table of the Elements (new IUPAC version) in an amount such as to give a weight of transition metal M atoms lower than 10% based on the total weight of the adduct.

2. The adduct according to claim 1 having the formula $MgCl_2 \cdot m(ROH)n \, [(Cp)p(ZR^1_q)_r (A)_s ML_t]$ wherein $(ZR^1_q)_r$ is a divalent group bridging Cp and A;

Z is C, Si, Ge, N or P;

$R^1$ is equal to or different from each other, and is hydrogen or a linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl, or two $R^1$ can form an aliphatic or aromatic $C_4$-$C_7$ ring;

Cp is a substituted or unsubstituted cyclopentadienyl group, optionally condensed to one or more substituted or unsubstituted, saturated, unsaturated or aromatic rings, containing from 4 to 6 carbon atoms, optionally containing one or more heteroatoms;

A is O, S, $NR^2$, $PR^2$ wherein $R^2$ is hydrogen, a linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl, or A has the same meaning as Cp;

L are equal to or different from each other, and are monoanionic sigma ligands selected from the group consisting of hydrogen, halogen, $R^3$, $OR^3$, $OCOR^3$, $SR^3$, $NR^3_2$ and $PR^3_2$, wherein $R^3$ is a linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl group, optionally containing one or more Si or Ge atoms; preferably, L are the same;

n is a number such as to give a weight of transition metal M atoms which is lower than 10% based on the total weight of the adduct;

p is 0 or 1;

q is 1 when Z is N or P and it is 2 when Z is C, Si or Ge;

r is an integer ranging from 0 to 4;

s is 0, 1 or 2; and t is an integer corresponding to formula v−(p+s) wherein v is an oxidation state of the transition metal M; with the proviso that r is 0 when s is 0.

3. The adduct according to claim 2, wherein n is a number such as to give a weight of transition metal M atoms which is lower than 7%.

4. The adduct according to claim 3, wherein n is a number such as to give a weight of transition metal M atoms which is lower than 5%.

5. The adduct according to claim 4, wherein n is a number such as to give a weight of transition metal M atoms which is lower than 2%.

6. The adduct according to claim 1, the adduct having a formula of $MgCl_2 \cdot m(ROH)n[M(OR^3)_a X_{b-a}]$, wherein M is a transition metal selected from Ti, Zr or V;

a is between 0 and b;

b is a valence of the transition metal M; and

X is halogen.

7. The adduct according to claim 6, wherein n gives a weight of the transition metal M atoms lower than 2%; the transition metal M is Ti; X is chlorine; and $R^3$ is selected from a linear or branched C1-C10 hydrocarbon.

8. The adduct according to claim 6, wherein $[M(OR^3)_a X_{b-a}]$ is $Ti(OBu)_4$, $Ti(OBu)Cl_3$, $Ti(OBu)_2Cl_2$, or $Ti(OBu)_3Cl$.

9. The adduct according to claim 1, wherein the adduct comprises a X-ray diffraction spectrum in which in a range of 2θ diffraction angles between 5° and 50° a characteristic diffraction line of the $MgCl_2$ is not present.

10. The adduct according to claim 1, further comprising a X-ray diffraction spectrum, wherein the x-ray diffraction spectrum comprises three main diffraction lines present in the range of 2θ diffraction angles between 5° and 15° at diffraction angles 2θ of 8.8±0.2°, 9.4±0.2° and 9.8±0.2°, the diffraction line at 2θ=8.8±0.2° being most intense, the two diffraction lines at 9.4±0.2° and 9.8±0.2° being at least 0.2 times as intense as the diffraction line at 2θ=8.8±0.2°.

11. The adduct according to claim 1, in spheroidal particle form.

12. The adduct according to claim 1, having a DSC profile wherein the adduct has a highest melting Temperature (Tm) peak lower than 107° C., and the adduct has an associated fusion enthalpy (ΔH) lower than 103 J/g.

13. The adduct according to claim 1, further comprising at least one electron donor compound selected from an ester, an ether, an amine, a silane, and a ketone.

14. A catalyst component for polymerizing olefins comprising a product of a reaction between a halogenating compound and an adduct comprising $MgCl_2$, an alcohol ROH present in a molar ratio with $MgCl_2$ defined by the formula $MgCl_2 \cdot m(ROH)$ in which m is a number from 0.5 to 6 and R is a C1-C10 hydrocarbon group, and a compound containing a transition metal N selected from the Groups 3 to 11 or the lanthanide or actinide groups of the Periodic Table of the Elements (new IUPAC version) in an amount such as to give a weight of transition metal M atoms lower than 10% based on the total weight of the adduct.

15. The catalyst component according to claim 14, wherein m is from 0.5 to 1.5.

16. The catalyst component according to claim 15, wherein the adduct is reacted with a halogenating compound having a reducing activity.

17. The catalyst component according to claim 16, wherein the halogenating compound having a reducing activity is an aluminium compound of formula $AlR_{3-z}X_z$, wherein R is a C1-C15 hydrocarbon alkyl radical; X is halogen; and z is a number 0<z<3.

18. A catalyst for polymerizing olefins comprising a product of a reaction between a catalyst component comprising an aluminium alkyl compound, and a product of a reaction between a halogenating agent and an adduct comprising $MgCl_2$, an alcohol ROH present in a molar ratio with $MgCl_2$ defined by the formula $MgCl_2 \cdot m(ROH)$ in which m is a number from 0.5 to 6 and R is a C1-C10 hydrocarbon group, and a compound containing a transition metal M selected from the Groups 3 to 11 or the lanthanide or actinide groups of the Periodic Table of the Elements (new TUPAC version) in an amount such as to give a weight of transition metal M atoms lower than 10% based on the total weight of the adduct.

19. The catalyst for polymerizing olefins according to claim 18, wherein the aluminium alkyl compound has a formula of $AlR_{3-z}X_z$, wherein R is a C1-C15 hydrocarbon alkyl radical; X is halogen; and z is a number $0 \leq z < 3$.

20. The catalyst for polymerizing olefins according to claim 19, wherein the aluminium alkyl compound is an Al-trialkyl compound.

21. A process for polymerizing olefins of formula $CH_2=CHR$, wherein R is hydrogen or a hydrocarbon radical having 1-12 carbon atoms, carried out in presence of a catalyst comprising a product of a reaction between a catalyst component comprising a product of a reaction between a halogenating agent, an aluminium alkyl compound, and an adduct comprising $MgCl_2$, an alcohol ROH present in a molar ratio with $MgCl_2$ defined by the formula $MgCl_2 \cdot m(ROH)$ in which m is a number from 0.5 to 6 and R is a C1-C10 hydrocarbon group, and a compound containing a transition metal M selected from the Groups 3 to 11 or the lanthanide or actinide groups of the Periodic Table of the Elements (new TUPAC version) in an amount such as to give a weight of transition metal M atoms lower than 10% based on the total weight of the adduct.

22. The adduct according to claim 2, wherein s is 0 or 1.

* * * * *

UNITED STATES PATENT AND TRADEMARK OFFICE
CERTIFICATE OF CORRECTION

PATENT NO. : 7,307,035 B2
APPLICATION NO. : 10/493636
DATED : December 11, 2007
INVENTOR(S) : Mario Sacchetti et al.

It is certified that error appears in the above-identified patent and that said Letters Patent is hereby corrected as shown below:

At col. 11, line 23, delete "$MgCl_2 \cdot m(ROH)n[(Cp)p(ZR^1_q)_r(A)_sML_t]$" and insert instead --$MgCl_2 \cdot m(ROH)n[(Cp)_p(ZR^1_q)_r(A)_sML_t]$--.

At col. 11, line 42, delete "$^{SR3}$" and insert instead --$SR^3$--.

At col. 12, line 53, delete "N" and insert instead --M--.

At col. 13, line 10, delete "TUPAC" and insert instead --IUPAC--.

At col. 14, line 14, delete "TUPAC" and insert instead --IUPAC--.

Signed and Sealed this

Twenty-fourth Day of March, 2009

JOHN DOLL
*Acting Director of the United States Patent and Trademark Office*